United States Patent
Nishi et al.

(10) Patent No.: US 10,996,103 B2
(45) Date of Patent: May 4, 2021

(54) OPTICAL OBSERVATION SYSTEM AND OPTICAL OBSERVATION METHOD

(71) Applicants: Fuji Jukogyo Kabushiki Kaisha, Tokyo (JP); Kyushu Institute of Technology, Kitakyushu (JP)

(72) Inventors: Takayuki Nishi, Tokyo (JP); Shinya Ohtsuka, Kitakyushu (JP)

(73) Assignee: SUBARU CORPORATION, Tokyo (JP)

( * ) Notice: Subject to any disclaimer, the term of this patent is extended or adjusted under 35 U.S.C. 154(b) by 127 days.

(21) Appl. No.: 15/449,730

(22) Filed: Mar. 3, 2017

(65) Prior Publication Data

US 2017/0284862 A1 Oct. 5, 2017

(30) Foreign Application Priority Data

Mar. 31, 2016 (JP) .............................. JP2016-069842

(51) Int. Cl.
| | |
|---|---|
| *G01J 1/04* | (2006.01) |
| *G08B 17/12* | (2006.01) |
| *G01J 1/02* | (2006.01) |
| *G01J 1/42* | (2006.01) |

(52) U.S. Cl.
CPC ............ *G01J 1/0425* (2013.01); *G01J 1/0219* (2013.01); *G01J 1/0403* (2013.01); *G01J 1/0488* (2013.01); *G01J 1/42* (2013.01); *G08B 17/12* (2013.01)

(58) Field of Classification Search
CPC ...... G01J 1/0425; G01J 1/0219; G01J 1/0403; G01J 1/0488; G01J 1/42; G08B 17/12
See application file for complete search history.

(56) References Cited

U.S. PATENT DOCUMENTS

| | | | |
|---|---|---|---|
| 4,702,553 A | 10/1987 | Buchmiiller et al. | |
| 4,775,233 A | 10/1988 | Kaneshi et al. | |
| | (Continued) | | |

FOREIGN PATENT DOCUMENTS

| | | | |
|---|---|---|---|
| JP | S 58-73846 A | 5/1983 | |
| JP | S 58-150912 A | 9/1983 | |
| | (Continued) | | |

OTHER PUBLICATIONS

Extended European Search Report dated Oct. 20, 2017.
(Continued)

*Primary Examiner* — Georgia Y Epps
*Assistant Examiner* — Don J Williams
(74) *Attorney, Agent, or Firm* — McGinn I.P. Law Group, PLLC.

(57) ABSTRACT

According to one implementation, an optical observation system includes an optical fiber and at least one detection system. The optical fiber has at least one curved portion as a sensor for inputting light which has occurred in a test region. The optical fiber inputs the light from the at least one curved portion and transmits the light. The at least one detection system detects the light transmitted by the optical fiber. Further, according to one implementation, an optical observation method includes: inputting light, which has occurred in a test region, from at least one curved portion of an optical fiber and transmitting the light; and detecting the light transmitted by the optical fiber.

20 Claims, 6 Drawing Sheets

(56) References Cited

U.S. PATENT DOCUMENTS

| | | | | |
|---|---|---|---|---|
| 4,924,870 | A | * | 5/1990 | Wlodarczyk ...... A61B 5/02154 600/480 |
| 7,116,870 | B2 | * | 10/2006 | Poole ................... G02B 6/2852 385/48 |
| 7,329,857 | B1 | | 2/2008 | Weiss |
| 7,526,167 | B1 | * | 4/2009 | Minelly ............. G02B 6/03633 359/341.3 |
| 7,725,026 | B2 | * | 5/2010 | Patel ........................ A61K 8/25 398/16 |
| 2004/0047535 | A1 | * | 3/2004 | Ukrainczyk ....... G01N 21/7703 385/12 |
| 2006/0017295 | A1 | * | 1/2006 | Danisch .............. B60R 21/0136 293/120 |
| 2007/0258090 | A1 | | 11/2007 | Kwon et al. |
| 2016/0018459 | A1 | | 1/2016 | Ohtsuka et al. |

FOREIGN PATENT DOCUMENTS

| | | |
|---|---|---|
| JP | S 62-8107 A | 1/1987 |
| JP | H 3-85936 A | 4/1991 |
| JP | H 9-42914 A | 2/1997 |
| JP | 2013-200213 A | 10/2013 |
| JP | 2014-137227 A | 7/2014 |
| JP | 2014-153298 A | 8/2014 |

OTHER PUBLICATIONS

European Office action, dated Dec. 20, 2019, in European Application No. 17 156 505.4.

Japanese Office Action, dated Feb. 6, 2020, in Japanese Patent Application No. 2016-069842 and English Translation thereof.

* cited by examiner

OPTICAL OBSERVATION SYSTEM AND OPTICAL OBSERVATION METHOD

CROSS REFERENCES TO RELATED APPLICATIONS

This application is based upon and claims the benefit of priority from Japanese Patent Application No. 2016-069842, filed on Mar. 31, 2016; the entire contents of which are incorporated herein by reference.

FIELD

Implementations described herein relate generally to an optical observation system and an optical observation method.

BACKGROUND

When electrical energy accumulates in a structure of an aircraft due to a lightning stroke, static electricity or the like, a spark occurs. The occurrence of a spark may cause fuel to ignite, which may interferes with the safety of a flight. Thus, conventionally in development of an aircraft, a huge number of tests have been done in order to confirm the existence of occurrence of a spark (for example, refer to Japanese Patent Application Publication JP 2014-153298 A). As a method of confirming the existence of occurrence of a spark, a photographic method and a gas ignition confirmation method are known.

The photographic method confirms the existence of a spark by photographing a test piece in which a current flows. Meanwhile, the gas ignition confirmation method confirms the existence of ignition by supplying a current to a test piece containing a flammable gas.

Furthermore, a technique to estimate energy of a spark has also been proposed as a related technique (for example, refer to Japanese Patent Application Publication JP 2014-137227 A).

In a spark confirmation test by the photographic method, even a spark having such a small energy that the spark does not ignite becomes a ground of rejection determination in the test as long as the spark is photographed. Therefore, an excessive countermeasure for preventing occurrence of a spark may be required. In addition, the photographic method has a problem that a spark may be photographed differently when cameras are different. Furthermore, a photographing direction by a camera is fixed in the photographic method. Therefore, there is a problem that in the case of photographing a test piece having a complicated structure, it may be unable to confirm the existence of a spark which has occurred at a position which becomes a shade of the test piece as seen from a position of the camera.

Meanwhile, in the case of the gas ignition confirmation method, there are problems that a test piece may ignite due to other than a spark, that a test piece may not ignite even when a spark occurs, and that the test takes long time and safety measures are necessary. Furthermore, in the case of testing a test piece having a complicated structure, a spark often occurs at a position which becomes a shade of the test piece as seen from a position of a camera. Therefore, a spark may not be seen even when the test piece ignites. When the test piece has ignited without the spark being seen, there is a problem that it cannot be confirmed whether the test piece has ignited due to the spark.

The above-mentioned conventional spark confirmation test has incurred an increase in a development period of an aircraft, and also has become a factor for increasing development costs of an aircraft. This is a common issue not only in development of an aircraft but also in development of a product for which it is necessary to prevent occurrence of a spark.

Thus, various techniques for detecting a spark even in the case of a test piece having a complicated structure have been proposed for a spark confirmation test of an aircraft or the like. For example, a system for specifying a position, at which a spark has occurred, by disposing many optical fibers on a test piece and performing photoelectric conversion of a light which has been input into an end portion of each of the optical fibers has been proposed (for example, refer to Japanese Patent Application Publication JP 2013-200213 A). That is, when many optical fibers are disposed on a test piece having a complicated structure, detection omission of a spark occurring at a position which becomes a shade of the test piece can be prevented.

However, when a spark confirmation test is performed using a plurality of optical fibers, placing a system takes time since many optical fibers, photoelectric converters and the like are necessary. Furthermore, since the system becomes a large scale, there are problems that manufacturing costs increase and that a large space is necessary for placing the system. These problems are common not only in a spark confirmation test but also in the case of detecting a light.

Thus, an object of the present invention is to allow confirming the existence of a light, such as a spark light, in satisfactory accuracy with a safer and simpler structure.

SUMMARY OF THE INVENTION

In general, according to one implementation, an optical observation system includes an optical fiber and at least one detection system. The optical fiber has at least one curved portion as a sensor for inputting light which has occurred in a test region. The optical fiber inputs the light from the at least one curved portion and transmits the light. The at least one detection system detects the light transmitted by the optical fiber.

Further, according to one implementation, an optical observation method includes: inputting light, which has occurred in a test region, from at least one curved portion of an optical fiber and transmitting the light; and detecting the light transmitted by the optical fiber.

DETAILED DESCRIPTION

An optical observation system and an optical observation method according to implementations of the present invention will be described with reference to the accompanying drawings.

(First Implementation)
(Structure and Function)

Figure 1:
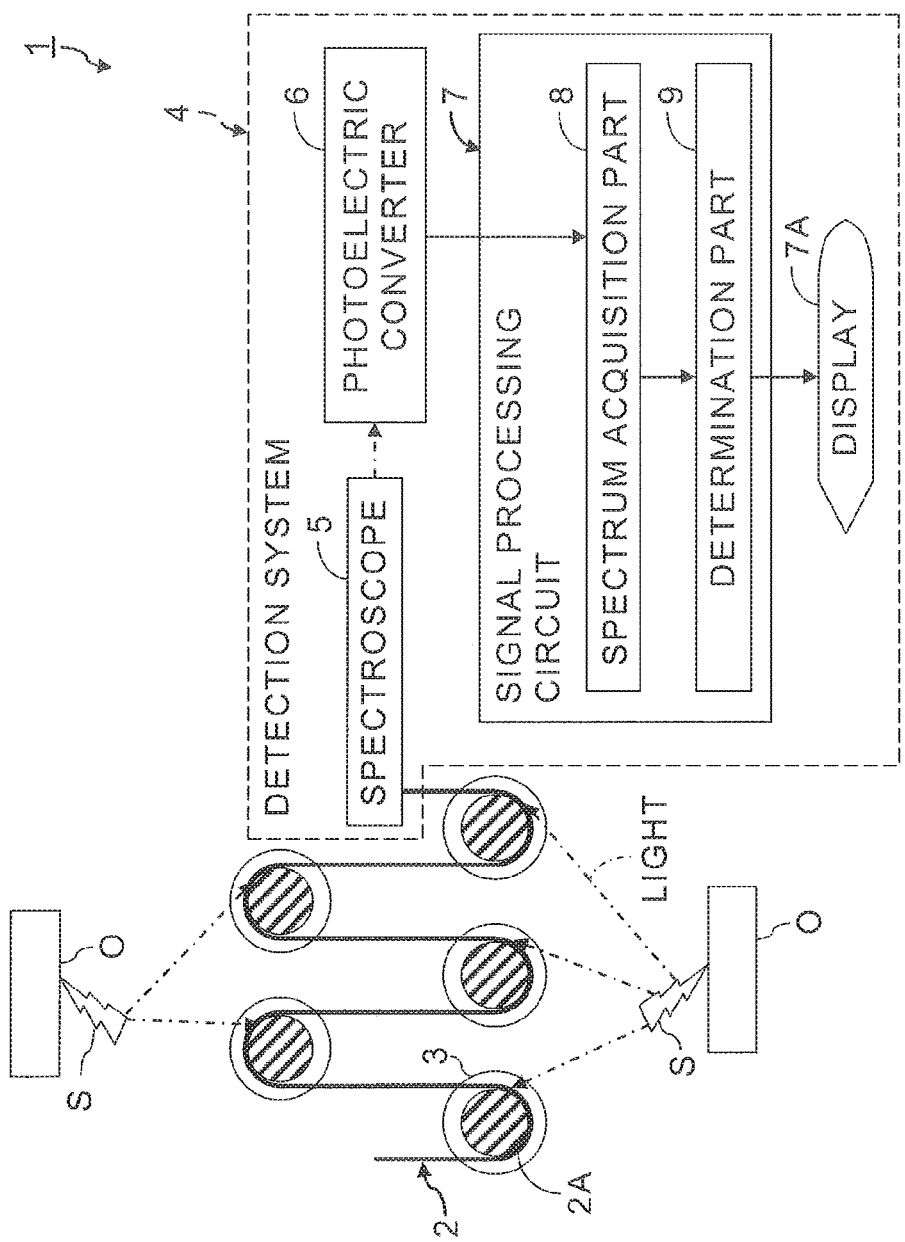
FIG. 1 shows a structure of an optical observation system according to the first implementation of the present invention.
Figure 2:
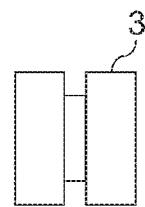
FIG. 2 is a side view of an optical fiber fixing implement shown in FIG. 1.

FIG. 1 shows a structure of an optical observation system according to the first implementation of the present invention. FIG. 2 is a side view of an optical fiber fixing implement shown in FIG. 1.

An optical observation system 1 detects whether a light has occurred in a test region. In the example shown in the figures, a spark light emitted when a spark S has occurred in an object O to be tested is a detection target of the optical observation system 1.

The optical observation system 1 has an optical fiber 2, at least one optical fiber fixing implement 3, and a detection system 4. The detection system 4 has a spectroscope 5, a photoelectric converter 6, and a signal processing circuit 7. The signal processing circuit 7 has a spectrum acquisition part 8 and a determination part 9. A display 7A can be coupled to the signal processing circuit 7.

The optical fiber 2 is fixed by each optical fiber fixing implement 3. Thereby, at least one curved portion 2A is formed in the optical fiber 2. In other words, each optical fiber fixing implement 3 is an instrument for disposing the optical fiber 2 in a state where the curved portion 2A has been formed in the optical fiber 2. For example, the optical fiber fixing implement 3 can be composed of a columnar body which has a groove, for winding the optical fiber 2, on the side surface.

Each curved portion 2A of the optical fiber 2 functions as a sensor to input a light which has occurred in a test region. That is, a light which has occurred in a test region is input not from the core at an end portion of the optical fiber 2, but from the clad side of the curved portion 2A to the core inside the optical fiber 2, to be transmitted.

Therefore, even lights which travel from different directions can be input to the core inside the optical fiber 2 from at least one of the curved portions 2A to be transmitted. Specifically, a light which satisfies conditions to totally reflect the inside of the core of the optical fiber 2 can be input from at least one of the curved portions 2A to be transmitted. That is, a light having a wavelength which satisfies the conditions and entering at least one of the curved portions 2A from a direction which satisfies the conditions can be transmitted by the optical fiber 2.

As a material of the optical fiber 2, quartz glass (silicon dioxide glass) and plastic are typical. Among these, the plastic optical fiber 2 can take a light with detectable intensity from the clad into the core of the optical fiber 2. Furthermore, in the case of the plastic optical fiber 2, the curvature radius of each curved portion 2A can be made not more than 150 mm. That is, the plastic optical fiber 2 can be bent so that each curved portion 2A is formed with a large curvature. Thereby, a range of directions in which lights can be input from each curved portion 2A can be secured.

Note that, a curvature radius is a radius of a circle when a curved line is regarded locally as a circular arc, and a curvature is a reciprocal number of a curvature radius.

The optical fiber 2 can have the curved portions 2A serving as sensors. Each of the curved portions 2A is convex toward possible generation sources of light which can be made incident. Thereby, a range of directions in which lights can be input to the optical fiber 2 can be further extended.

In the example shown in the figures, the optical fiber 2 is disposed so that a spark light which occurred in a test region can be input from the curved portions 2A which have been disposed on a plane as sensors. Specifically, tensions are applied on the optical fiber 2 from both sides at different positions by the columnar optical fiber fixing implements 3 which are not on a same straight line. Thereby, the optical fiber 2 meanders so that the plurality of curved portions 2A convex toward two directions are formed in the optical fiber 2. Therefore, a detection area of light can be widened. In particular, even lights traveling from directions opposite to each other can be input to the one optical fiber 2, and can be transmitted.

The curved portions 2A may be disposed three dimensionally (3D) different positions to allow 3D detection of lights, i.e., detection of lights traveling from different spatial positions. Alternatively, the optical fibers 2, each having the curved portion 2A or the plurality of curved portions 2A, may be disposed on planes which are not parallel, such as three planes orthogonal to each other, to allow performing 3D detection of lights.

Note that, the conventional spark confirmation test for confirming the existence of a spark light is performed for a two dimensional (2D) region as a test area. Therefore, disposing the optical fiber 2 as shown in the figures so that 2D light detection can be performed is sufficient to perform a spark confirmation test.

Each optical fiber fixing implement 3 can be also made of a material, such as a transparent resin. In this case, it can be avoided that a light occurred in a test region is interrupted by the optical fiber fixing implements 3.

On the other hand, the detection system 4 has a function to detect a light transmitted by the optical fiber 2. The spectroscope 5 of the detection system 4 is an optical device for dispersing a light transmitted by the optical fiber 2. The photoelectric converter 6 is a device for performing photoelectric conversion of a light having every wavelength dispersed by the spectroscope 5 to convert the light into an electric signal whose amplitude is light intensity at every wavelength. The photoelectric converter 6 can be composed using a light receiving element (photodetector), such as a photodiode or a phototransistor.

The signal processing circuit 7 performs signal processing of a light detection signal generated as an electric signal in the photoelectric converter 6. The signal processing circuit 7 may have an A/D (analog to digital) converter to digitize a light detection signal so that the digitized light detection signal can be processed in electronic circuits, such as a computer.

Therefore, The signal processing circuit 7 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the signal processing circuit 7. Such a medium may take many forms, including, but not limited to, any type of magnetic medium such as a hard disk, any type of optical medium such as a compact disc (CD) and a digital versatile disk (DVD), any type of semiconductor memory (i.e., semiconductor circuit) such as a volatile memory and a non-volatile memory. The volatile memory may include a dynamic random access memory (DRAM) and a static random access memory (SRAM), and the nonvolatile memory may include a read-only memory (ROM) and a non-volatile random access memory (NVRAM). The ASIC is an integrated circuit (IC) customized to perform, and the FPGA is an integrated circuit designed to be configured after manufacturing in order to perform, all or a part of the functions of the modules shown in FIG. 1.

The spectrum acquisition part 8 of the signal processing circuit 7 has a function to obtain a wavelength spectrum of a light, transmitted by the optical fiber 2, based on the light detection signals corresponding to respective wavelengths, generated as electric signals in the photoelectric converter 6, i.e., signals whose amplitudes are light intensities at the respective wavelengths.

The determination part 9 has a function to display information for determining whether light emitting arose in a test region, based on a light wavelength spectrum which has been obtained in the spectrum acquisition part 8, on the display 7A.

For example, the maximum value or a local maximum value in a predetermined wavelength band can be detected from a wavelength spectrum of a light transmitted by the optical fiber 2. Then, it can be determined that light emitting has occurred in a test region when the maximum value or the local maximum value is not less than a threshold, which has been determined empirically, or exceeds the threshold. Alternatively, an index, such as an area of a region surrounded by a waveform, may be used instead of the maximum value or the local maximum value. Therefore, the determination part 9 can have a function to automatically determine whether light emitting arose in a test region, by performing the threshold processing. Thereby, the determination part 9 can display a determination result of whether light emitting arose in a test region, on the display 7A, as a result of the threshold processing.

Alternatively, the determination part 9 may display a light wavelength spectrum itself on the display 7A as information for determining whether light emitting arose in a test region. In this case, a user can visually determine whether light emitting arose in the test region, by referring to the light wavelength spectrum displayed on the display 7A.

Furthermore, when a spark light in a test region is a detection target, the determination part 9 can have a function to display information for determining whether the spark S causing the spark light is an explosive spark S, based on an intensity of light in at least one specific wavelength band included in the spark light transmitted by the optical fiber 2, on the display 7A. When a spark light in a test region is a detection target, the determination part 9 may determine whether a spark light has arisen by the explosive spark S, instead of determining whether a spark light has arisen. That is, the determination part 9 can have a function to display at least one of information for determining whether a spark light has arisen and information for determining whether a spark light has arisen by an explosive spark S, on the display 7A.

Figure 3:
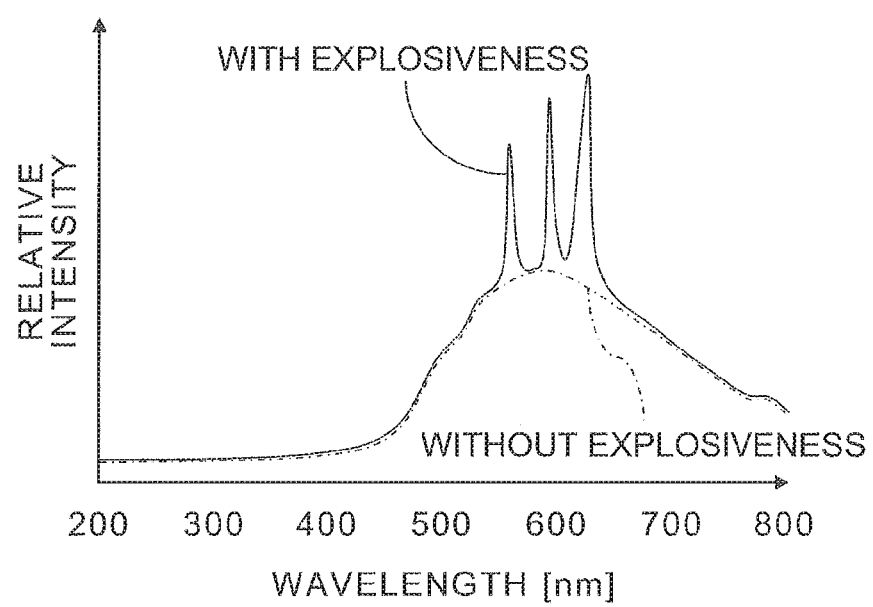
FIG. 3 is a graph showing an example of wavelength spectrum of spark light, which is referred to for determining whether the spark light detected in the detection system shown in FIG. 1 has explosiveness.

FIG. 3 is a graph showing an example of wavelength spectrum of spark light, which is referred to for determining whether the spark light detected in the detection system 4 shown in FIG. 1 has explosiveness.

In FIG. 3, the horizontal axis shows a wavelength of a spark light while the vertical axis shows relative intensity of the spark light. A relationship between a waveform of a wavelength spectrum of a spark light and whether the spark S causing the spark light has explosiveness was examined by tests. The solid line shows a wavelength spectrum of a spark light when the spark S causing the spark light has explosiveness while the dashed-dotted line shows a wavelength spectrum of a spark light when the spark S causing the spark light is not explosive.

As a result of the tests, it became clear that peaks appeared in the wavelength spectrum of the spark light in the specific wavelength bands, as shown in FIG. 3 when the spark S, which arose from the object O to be tested, had explosiveness due to igniting an inflammable material, such as fuel. That is, a relation that the spark S, which arose from the object O to be tested, was the explosive spark S when a peak appeared in the wavelength spectrum of the spark light in at least one of the specific wavelength bands was empirically confirmed.

More specifically, a relation that a spark S had explosiveness when a peak was observed in a wavelength spectrum in at least one wavelength band out of the first wavelength band of not less than 588 nm and not more than 591 nm, the second wavelength band of not less than 552 nm and not more than 555 nm, and the third wavelength band of not less than 619 nm and not more than 623 nm was confirmed. FIG. 3 shows an example in which the peak was observed in each of the first wavelength band of not less than 588 nm and not more than 591 nm, the second wavelength band of not less than 552 nm and not more than 555 nm, and the third wavelength band of not less than 619 nm and not more than 623 nm. In particular, it was also confirmed that the highest level peak appeared in the first wavelength band of not less than 588 nm and not more than 591 nm, in many cases when the spark S was the explosive spark S.

Therefore, when the determination part 9 determines whether a peak has appeared in at least one of the first wavelength band of not less than 588 nm and not more than 591 nm, the second wavelength band of not less than 552 nm and not more than 555 nm, and the third wavelength band of not less than 619 nm and not more than 623 nm, it can be automatically detected whether the spark S causing the spark light has explosiveness. That is, the determination part 9 can automatically detect whether a spark light due to the explosive spark S has arisen.

As a specific example of automatic determination processing of the existence of explosiveness, it can be determined that a spark light due to the explosive spark S has arisen when a peak is detected from a wavelength spectrum of the spark light and a wavelength corresponding to the detected peak lies in at least one of the first wavelength band of not less than 588 nm and not more than 591 nm, the second wavelength band of not less than 552 nm and not more than 555 nm, and the third wavelength band of not less than 619 nm and not more than 623 nm.

As another example, a threshold determined by tests can be set in at least one of the first wavelength band of not less than 588 nm and not more than 591 nm, the second wavelength band of not less than 552 nm and not more than 555 nm, and the third wavelength band of not less than 619 nm and not more than 623 nm. Then, it can also be determined that a spark light due to the explosive spark S has arisen when intensity of a wavelength spectrum of the spark light exceeds the threshold.

Alternatively, the determination part 9 may display a wavelength spectrum itself of a spark light, as information for determining whether the spark light has arisen by the explosive spark S, on the display 7A. In this case, a user can visually determine whether the explosive spark S has arisen in the test region, by referring to the wavelength spectrum of the spark light displayed on the display 7A.

When determination of explosiveness is not performed, intensities of light detection signals corresponding to wavelengths are not necessarily required. Therefore, the spectroscope 5 may be omitted. In that case, the determination part 9 can perform threshold processing of the intensity of light transmitted by the optical fiber 2, and automatically determine that a light has arisen in a test region when the light intensity has become not less than a predetermined threshold or has exceeded the predetermined threshold.

As a matter of course, a signal waveform showing a time change in intensity of light transmitted by the optical fiber 2 may be displayed on the display 7A so that a user can determine whether a light has arisen in a test region by referring to the time waveform of light intensity signal displayed on the display 7A. In that case, the detection system 4 may be composed of the photoelectric converter 6 and an oscilloscope which displays an electric signal having an amplitude corresponding to a light intensity.

Conversely, even in the case of performing determination of explosiveness, the spectroscope 5 may also be omitted while a wavelength filter may be disposed when the existence of explosiveness is determined by threshold processing of each intensity of spark light in the specific wavelength band or the specific wavelength bands consisting of at least one of the first wavelength band, the second wavelength band, and the third wavelength band, without performing peak detection from a wavelength spectrum.

When the explosiveness of the spark S is determined, it is preferable to make a curvature of each curved portion 2A of the optical fiber 2, used as a sensor of a spark light, be an appropriate curvature for inputting the spark light, in at least one of the specific wavelength bands, used for the determination of explosiveness. It is necessary to totally reflect a spark light, in at least one of the specific wavelength bands, inside the core of the optical fiber 2 in order to input the spark light, in at least one of the specific wavelength bands, into the core. Therefore, the appropriate curvature of each curved portion 2A for inputting the spark light, in at least one of the specific wavelength bands, into the optical fiber 2 can be determined to be a curvature corresponding to an optical refractive index of the optical fiber 2 in at least one of the specific wavelength bands. The appropriate curvature of each curved portion 2A may be theoretically obtained based on physical property values, such as a refractive index of the core, or may be empirically obtained by tests.

As a matter of course, it is appropriate to form the curved portions 2A in the optical fiber 2 according to a wavelength of a light which may be a detection target so that each curved portion 2A of the optical fiber 2 has an appropriate curvature in order to input a light, which arose in a test region, from the curved portion 2A, regardless of whether determination of explosiveness of the spark S is performed.

(Operation and Action)

Next, an optical observation method of a spark light or the like using the optical observation system 1 will be described.

Firstly, the optical fiber 2 is disposed in a state where the curved portions 2A have been formed in the optical fiber 2 as exemplified in FIG. 1. The curved portions 2A can be formed in the optical fiber 2 in desired shapes by determining structures of the optical fiber fixing implements 3. At this time, the convex curved portions 2A are directed toward test regions in which light is to be observed. For example, when an observation target is a spark light in case that the spark S has occurred in at least one of the objects O to be tested, the curved portions 2A are disposed to protrude toward the objects O to be tested respectively, as exemplified in FIG. 1. Thereby, lights can be observed using the optical observation system 1.

When a light arises in the test region, the light enters the core from at least one of the curved portions 2A of the optical fiber 2. Therefore, even lights propagating in space from different directions can be input inside the core of the optical fiber 2 through the clad from at least one of the curved portions 2A as long as incident conditions are fulfilled, unlike a case of inputting a light from the end portion of the optical fiber 2.

For example, in the case of a lightning stroke test of an aircraft structural object, a current simulating a lightning stroke current is applied to a test piece simulating the aircraft structural object. Then, a spark S arises as a current propagating in space depending on characteristics and a structure of the test piece. Thereby, a spark light arising with the spark S enters the inside of the core from at least one of the curved portions 2A of the optical fiber 2. Therefore, even when the spark S has arisen at an uncertain position of the object O to be tested, the spark light propagating in space from an uncertain direction can be input inside the core from at least one of the curved portions 2A of the optical fiber 2.

The light, such as a spark light, which has entered the inside of the core of the optical fiber 2 is transmitted with totally reflecting the inside of the core. Then, the light transmitted by the optical fiber 2 is detected by the detection system 4. Specifically, the light transmitted by the optical fiber 2 is dispersed to lights corresponding to wavelengths by the spectroscope 5. Subsequently, the lights corresponding to the wavelengths are converted into electric signals whose amplitudes are light intensities respectively, in the photoelectric converter 6. The electric signals corresponding to the wavelengths generated in the photoelectric converter 6 are output to the signal processing circuit 7 as light detection signals corresponding to the wavelengths. In the signal processing circuit 7, a light wavelength spectrum is obtained in the spectrum acquisition part 8 after signal processing, such as A/D conversion processing and noise processing, is performed. The light wavelength spectrum obtained in the spectrum acquisition part 8 is given to the determination part 9.

In the determination part 9, it can be automatically determined whether light, such as a spark light, has arisen in the test region and whether the spark light has arisen from the explosive spark S, based on the light wavelength spectrum. For example, the existence of light emitting in the test region can be automatically determined by threshold processing of the maximum value, the local maximum value, or an area of a region surrounded by a waveform of the light wavelength spectrum. In addition, it can be automatically determined whether the spark light has arisen from the explosive spark S by detecting at least one of the peaks in the specific wavelength bands, which appear only in a wavelength spectrum of spark light arisen from an explosive spark S.

A determination result in the determination part 9 can be displayed on the display 7A. Furthermore, the light wavelength spectrum itself can also be displayed on the display 7A with the determination result or instead of the determination result. Thereby, a user can confirm the existence of light emitting in the test region and whether the spark light has arisen from the explosive spark S, by referring to information displayed on the display 7A.

As described above, the optical observation system 1 and the optical observation method allow detecting lights, which travel from a plurality of directions, by the single optical fiber 2 disposed in a curved line, by taking advantage of characteristic of the optical fiber 2 that a light also enters the optical fiber 2 from the clad. Note that, while a part of light which has entered the optical fiber 2 from the clad in a certain curved portion 2A may be output again from the clad in the same or another curved portion 2A, light having sufficient intensity for detection can be transmitted to the detection system 4 by limiting the number and lengths of the curved portions 2A to the appropriate number and lengths.
(Effects)

Accordingly, the optical observation system 1 and the optical observation method can reduce the number of the optical fibers 2 in the case of detecting lights which may propagate in space from a plurality of directions. That is, it becomes possible to detect lights arising at different positions using the single optical fiber 2. As a result, a structure of the optical observation system 1 can be simplified compared with the conventional system which detects lights at many points using many optical fibers. Furthermore, an observation time can be shortened compared with the conventional observation method performed by disposing many optical fibers. Thereby, labor and costs required for observation tests of lights can be reduced.

For example, in the case of a lightning stroke test of an aircraft structural object for confirming the existence of the spark S between a composite material, such as GFRP (glass fiber reinforced plastics), and an object made of a metal, tests can be performed safely since a gas having inflammability is not used. In addition, when a test piece has a complicated structure, the spark S which has occurred at an uncertain position can be detected. Thereby, accuracy of the lightning stroke test can be improved.

As a matter of course, not only limited to a lightning stroke test of an aircraft structural object, the above-mentioned optical observation system 1 and optical observation method can detect the existence of light emitting in a desired test region. For example, in case that a high current has flowed due to a stroke of lightning to or an accident in a fuel tank of a car, a motorbike, a ship, a robot or the like, the existence of occurrence of a spark S can be confirmed or explosive estimation of the spark S can be performed.
(Second Implementation)

Figure 4:
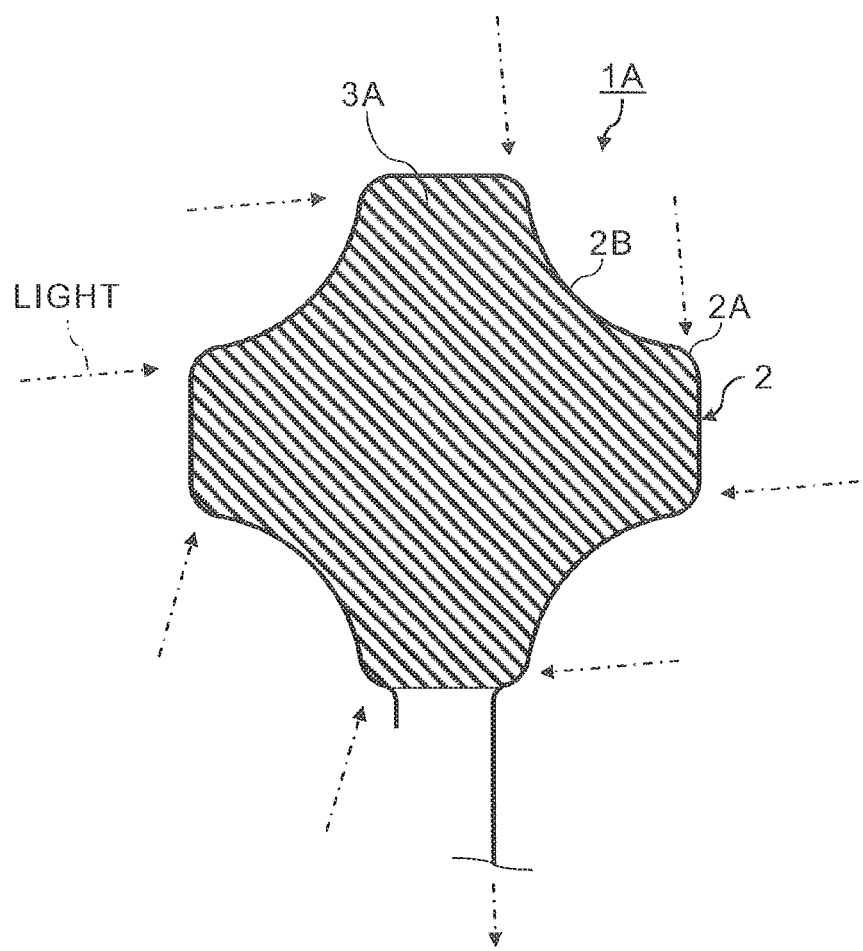
FIG. 4 shows a structure of an optical observation system according to the second implementation of the present invention.

FIG. 4 shows a structure of an optical observation system according to the second implementation of the present invention.

An optical observation system 1A in the second implementation shown in FIG. 4 is different from the optical observation system 1 in the first implementation in a structure of an optical fiber fixing implement 3A. Other structures and functions of the optical observation system 1A in the second implementation are not substantially different from those of the optical observation system 1 in the first implementation. Therefore, only the optical fiber 2 and the optical fiber fixing implement 3A are illustrated, and the same structures or corresponding structures are shown by the same signs with their explanations omitted.

As exemplified in FIG. 4, the optical fiber fixing implement 3A can have a structure in which a groove has been formed along a circumference of a core body having concavity and convexity in a cross section. Then, the plurality of convex curved portions 2A can be formed in the optical fiber 2 by winding the optical fiber 2 to the optical fiber fixing implement 3A by even not more than one round. That is, the optical fiber 2 can be disposed so that the convex curved portions 2A are formed as sensors in both sides of each of concave curved portions 2B. Furthermore, the plurality of the curved portions 2A convex toward different directions can be formed in the optical fiber 2 as sensors respectively.

In the example shown in FIG. 4, the concave curved portions 2B have been formed on the four corners while the convex curved portions 2A have been formed in both sides of each of the four concave curved portions 2B. Therefore, the eight curved portions 2A protruding in directions different from each other have been formed as sensors respectively. Note that, the optical fiber fixing implement 3A having the size of about 30 mm×30 mm in width was actually produced, and the plurality of the curved portions 2A were formed so that each curvature radius become not less than 1 mm and not more than 3 mm in order to easily input spark lights in the specific wavelength bands, which should be input for explosive determination of the spark S.

When the optical fiber fixing implement 3A has a structure having concavity and convexity as shown in FIG. 4, the plurality of the curved portions 2A of which curvature radii are small can be easily formed in the optical fiber 2 toward different directions. That is, the plurality of the curved portions 2A can be formed in the optical fiber 2 even without disposing the plurality of the optical fiber fixing implements 3 to make the optical fiber 2 meander as exemplified in FIG. 1.

When the curvature radius can be enlarged, the curved portion 2A, which can input lights traveling from directions opposite to each other, can be formed in the optical fiber 2 by winding the optical fiber 2 around the one columnar optical fiber fixing implement 3 as exemplified in FIG. 1 by not less than half round and not more than one round. When the optical fiber 2 is winded around the one columnar optical fiber fixing implement 3 as exemplified in FIG. 1 by not less than one round, light propagating in space from any 360-degree direction can be input to the optical fiber 2 from the curved portion 2A.

As a matter of course, the optical fiber fixing implement 3A may be a core body, other than a column, of which a shape of a cross section is a polygon, such as a triangle, having R chamfers. In that case, the plurality of the curved portions 2A of which number corresponds to the number of vertices of the polygon can be formed in the optical fiber 2. Furthermore, a groove or grooves may be formed in a solid or a sphere to produce the optical fiber fixing implement 3A which can form the plurality of the curved portions 2A in the optical fiber 2 three dimensionally.

The above-mentioned optical observation system 1A in the second implementation can achieve effects that the length of the optical fiber 2 can be shortened and a space necessary for disposing the optical fiber 2 can be reduced, in addition to effects similar to those of the optical observation system 1 in the first implementation. In addition, a plurality of the curved portions 2A whose curvature radii are small can be simply formed toward different directions. Thereby, lights which have occurred at uncertain positions and propagate from different directions can be detected by the single optical fiber 2 without omission.
(Third Implementation)

Figure 5:
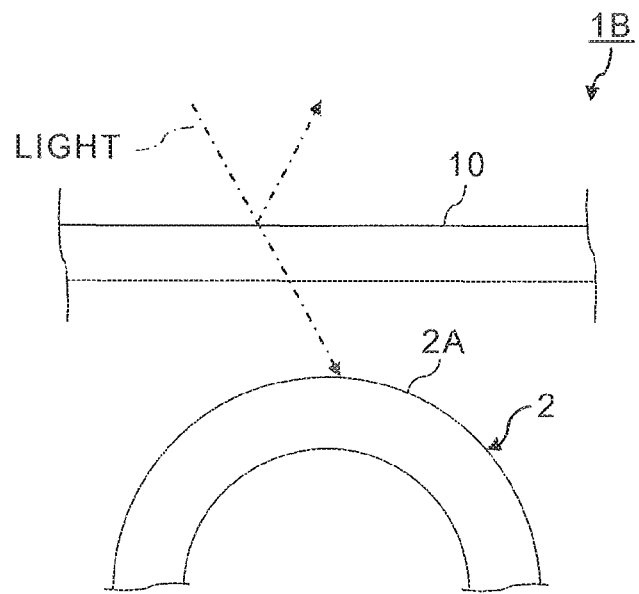
FIG. 5 shows a structure of an optical observation system according to the third implementation of the present invention.

FIG. 5 shows a structure of an optical observation system according to the third implementation of the present invention.

An optical observation system 1B in the third implementation shown in FIG. 5 is different from each of the optical observation system 1 in the first implementation and the optical observation system 1A in the second implementation in a point that a wavelength filter 10 has been placed near the optical fiber 2. Other structures and functions of the optical observation system 1B in the third implementation are not substantially different from those of each of the optical observation system 1 in the first implementation and the optical observation system 1A in the second implementation. Therefore, only the optical fiber 2 and the wavelength filter 10 are illustrated, and the same structures or corresponding structures are shown by the same signs with their explanations omitted.

The optical observation system 1B has the wavelength filter 10 which selectively transmits light in at least one specific wavelength band, where a peak appears only in a wavelength spectrum of a spark light arising with the explosive spark S, in order to input the transmitted light into at least one of the convex curved portions 2A of the optical fiber 2, as sensors. In the example shown in FIG. 5, the platy wavelength filter 10 has been disposed in the light source side of the curved portion 2A. A structure and a position of the wavelength filter 10 can be favorably determined as long as only light component in at least one of the specific wavelength bands can be selectively transmitted out of light which has arisen in a test region in order to input the light component into at least one of the curved portions 2A of the optical fiber 2.

Furthermore, each optical fiber fixing implement 3, 3A, having a structure as exemplified in FIG. 1 or FIG. 4, for disposing the optical fiber 2 so as to form at least one curved portion 2A in the optical fiber 2 may be made of a material which transmits light in at least one of the specific wavelength bands. That is, each optical fiber fixing implement 3, 3A itself may be composed of a wavelength filter.

The above-mentioned optical observation system 1B in the third implementation can achieve effects that only light component or light components each having a wavelength important for the explosive determination of the spark S can be selectively transmitted by the optical fiber 2, in addition to effects similar to those of the optical observation system 1 in the first implementation and the optical observation system 1A in the second implementation. As a result, even when the spectroscope 5 is omitted, the explosive determination of the spark S can be performed.

When each optical fiber fixing implement 3, 3A itself is composed of a wavelength filter, light component or light components each having a wavelength important for the explosive determination of the spark S can be avoided from being interrupted by the optical fiber fixing implement 3, 3A or the optical fiber fixing implements 3, 3A.

(Fourth Implementation)

Figure 6:
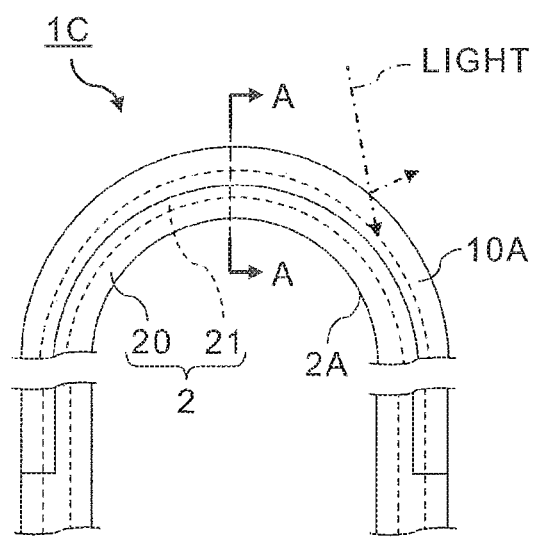
FIG. 6 shows a structure of an optical observation system according to the fourth implementation of the present invention.
Figure 7:
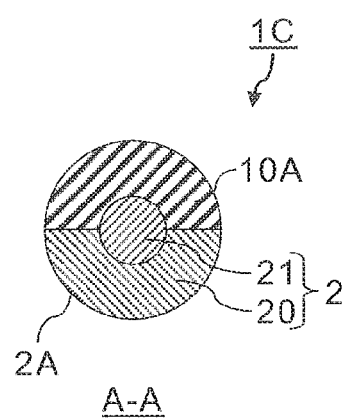
FIG. 7 is a cross-sectional view of the optical fiber and the wavelength filter at the position A-A shown in FIG. 6.

FIG. 6 shows a structure of an optical observation system according to the fourth implementation of the present invention. FIG. 7 is a cross-sectional view of the optical fiber and the wavelength filter at the position A-A shown in FIG. 6.

An optical observation system 1C in the fourth implementation shown in FIG. 6 is different from the optical observation system 1B in the third implementation in a point that a part of the clad 20 of the optical fiber 2 has been removed to expose the core 21 while the exposed core 21 has been covered by a wavelength filter 10A. Other structures and functions of the optical observation system 1C in the fourth implementation are not substantially different from those of the optical observation system 1B in the third implementation. Therefore, only the optical fiber 2 and the wavelength filter 10A are illustrated, and the same structures or corresponding structures are shown by the same signs with their explanations omitted.

When a part of the clad 20 of the optical fiber 2 is removed, an intensity of a light which enters the core 21 can be enlarged. Thereby, not only when the optical fiber 2 is made of plastic, but even when the optical fiber 2 is made of fused quartz, a light having a detectable intensity can be input into the core 21. Thus, a part of the clad 20 of the optical fiber 2 in at least one curved portion 2A which configures a sensor can be removed.

Furthermore, the core 21 of the optical fiber 2 exposed by removing the part of the clad 20 of the optical fiber 2 in at least one curved portion 2A which configures a sensor can be covered by the wavelength filter 10A which selectively transmits light in at least one of the specific wavelength bands. Thereby, it becomes possible to selectively input only light component or light components, each having a wavelength important for the explosive determination of the spark S, into the core 21 of the optical fiber 2.

Note that, a part of the clad 20 of the optical fiber 2 at the curved portion 2A can be removed in order to enlarge an intensity of a light which enters the core 21, regardless of whether to dispose the wavelength filter 10A for shielding the exposed core 21 or the wavelength filter 10 near the curved portion 2A as exemplified in the third implementation. That is, a part of the clad 20 of the optical fiber 2 in at least one curved portion 2A can also be removed in the optical observation system 1 in the first implementation or the optical observation system 1A in the second implementation.

The above-mentioned optical observation system 1C in the fourth implementation can achieve effects that an intensity of light entering the core 21 can be enlarged by removing the clad 20, in addition to effects similar to those of the optical observation system 1 in the first implementation, the optical observation system 1A in the second implementation, and the optical observation system 1B in the third implementation. As a result, detection sensitivity of light which has arisen in a test region can be improved.

Furthermore, the optical observation system 1C can achieve an effect that placing the wavelength filter 10 can be omitted, in addition to effects similar to those of the optical observation system 1B in the third implementation, by shielding the exposed core 21 by the wavelength filter 10A. As a result, the optical observation system 1C can be made compact in size.

(Fifth Implementation)

Figure 8:
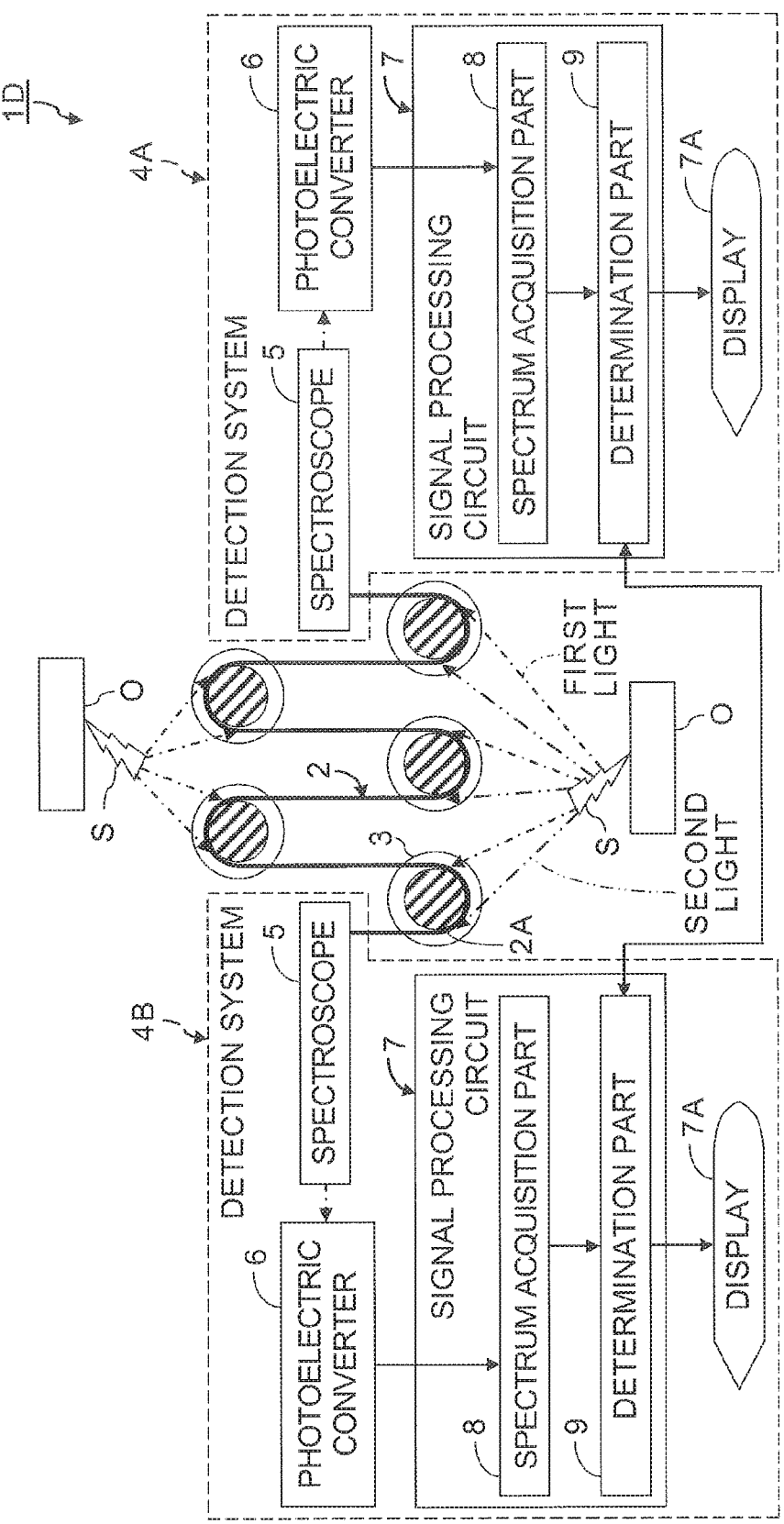
FIG. 8 shows a structure of an optical observation system according to the fifth implementation of the present invention.

FIG. 8 shows a structure of an optical observation system according to the fifth implementation of the present invention.

An optical observation system 1D in the fifth implementation shown in FIG. 8 is different from the optical observation system 1 in the first implementation in a point that detection systems 4A, 4B have been coupled to both sides of the optical fiber 2 respectively. Other structures and functions of the optical observation system 1D in the fifth implementation are not substantially different from those of the optical observation system in the first implementation. Therefore, the same structures or corresponding structures are shown by the same signs with their explanations omitted.

In the optical observation system 1D, the first detection system 4A is coupled to one end of the optical fiber 2 while the second detection system 4B is coupled to the other end of the optical fiber 2. Thereby, lights transmitted bidirectionally in the optical fiber 2 can be detected using the first detection system 4A and the second detection system 4B respectively. Therefore, even when an incident angle of a light to a certain curved portion 2A is opposite to a direction toward the first detection system 4A, the light which has entered the curved portion 2A can be detected using the second detection system 4B.

That is, while each of the optical observation systems 1, 1A, 1B and 1C in other implementations can detect a light only when the light is transmitted by the optical fiber 2 toward a direction where the single detection system 4 has been coupled, the optical observation system 1D in the fifth implementation can certainly detect a light by either the first detection system 4A or the second detection system 4B whether the light is transmitted by the optical fiber 2 toward either direction. Therefore, while detectable incident directions of lights are not plane symmetry with respect to a plane orthogonal to the curved portion 2A in the optical observation systems 1, 1A, 1B and 1C in other implementations, detectable incident directions of lights become plane symmetry in the optical observation system 1D in the fifth implementation.

When a light which has arisen in a test region does not have directivity, the light is detected in both of the first detection system 4A and the second detection system 4B in many cases. Therefore, an intensity and a wavelength spectrum of the light can be obtained in each of the first detection system 4A and the second detection system 4B. Thus, at least one of two light detection signals and two wavelength spectra obtained in the first detection system 4A and the second detection system 4B can be compared to each other. Then, a position at which the light has arisen can be estimated based on a difference or a ratio in intensity between the two light detection signals, and/or an index value showing a difference between the two wavelength spectra.

Thus, the signal processing circuit 7 can have a function to estimate a position at which a light has arisen, based on the two light detection signals obtained in the first detection system 4A and the second detection system 4B respectively. For example, when a table or a function showing a relationship between positions at which lights have arisen and differences or ratios in intensity between two light detection signals obtained in the first detection system 4A and the second detection system 4B is obtained by tests, a position at which a light has arisen can be estimated based on a difference or a ratio in intensity between a set of two light detection signals, by referring to the table or the function. In this case, obtaining wavelength spectra is not necessarily required.

Alternatively, when a table or a function showing a relationship between positions at which lights have arisen and index values, such as differences in area, ratios in area, square errors, cross-correlation values, showing differences between two wavelength spectra obtained in the first detection system 4A and the second detection system 4B respectively is obtained by tests, a position at which a light has arisen can be estimated based on a set of two wavelength spectra, by referring to the table or the function.

These functions can be provided in each of the determination parts 9 of the first detection system 4A and the second detection system 4B. Therefore, all or a part of the signal processing circuits 7 in the first detection system 4A and the second detection system 4B may be unified. As a matter of course, the detection systems 4A, 4B can be coupled to both ends of the optical fiber 2 so that the determination parts 9 can have the function to estimate a position at which a light has arisen not only in the optical observation system 1 in the first implementation but also in the optical observation system 1A in the second implementation, the optical observation system 1B in the third implementation, or the optical observation system 1C in the fourth implementation.

The above-mentioned optical observation system 1D in the fifth implementation can achieve effects that a test region in which an occurrence of light can be detected can be widened, in addition to effects similar to those of each of the optical observation systems 1, 1A, 1B and 1C in other implementations. Furthermore, it becomes possible to estimate an occurrence position of light.

OTHER IMPLEMENTATIONS

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. An optical observation system, comprising:
an optical fiber that has at least one curved portion as a sensor for inputting light which has occurred at an uncertain position in a test region and propagated in space from an uncertain direction, the optical fiber inputting the light from a portion other than a core at any end portion of the optical fiber, the at least one curved portion inputting the light propagated in the space from a clad side of the curved portion into the core inside the optical fiber, the optical fiber transmitting the light input at the at least one curved portion; and
at least one detection system that detects the light transmitted by the optical fiber.

2. The optical observation system according to claim 1, wherein the at least one curved portion includes curved portions, each of the curved portions being convex toward a generation source of possible light to be input.

3. The optical observation system according to claim 2, wherein the optical fiber is disposed to form a concave curved portion and the convex curved portions in both sides of the concave curved portion, the convex curved portions facing different directions respectively, each of the convex curved portions serving as the sensor.

4. The optical observation system according to claim 2, wherein a part of a clad of the optical fiber at the at least one curved portion as the sensor is removed.

5. The optical observation system according to claim 2, wherein the light includes spark light, and
wherein the at least one detection system is adapted to display information for determining whether a spark causing the spark light is explosive, based on an intensity of a light in a specific wavelength band included in the spark light transmitted by the optical fiber.

6. The optical observation system according to claim 1, wherein the optical fiber is disposed to form a concave curved portion and convex curved portions in both sides of the concave curved portion, the convex curved portions facing different directions respectively, each of the convex curved portions serving as the sensor.

7. The optical observation system according to claim 1, wherein a part of a clad of the optical fiber at the at least one curved portion as the sensor is removed.

8. The optical observation system according to claim 1, wherein the light includes spark light, and
wherein the at least one detection system is adapted to display information for determining whether a spark causing the spark light is explosive; based on an intensity of a light in a specific wavelength band included in the spark light transmitted by the optical fiber.

9. The optical observation system according to claim 8, wherein a curvature of the at least one curved portion as the sensor corresponds to a refractive index of the light in the specific wavelength band, the curvature being adjusted for inputting the light in the specific wavelength band.

10. The optical observation system according to claim 8, further comprising:
a wavelength filter that transmits the light in the specific wavelength band and inputs the light in the specific wavelength band into the at least one curved portion as the sensor.

11. The optical observation system according to claim 7, wherein a part of the core of the optical fiber is covered by the wavelength filter, the part of the core being exposed by removing a part of a clad of the optical fiber at the at least one curved portion as the sensor.

12. The optical observation system according to claim 8, further comprising:
an optical fiber fixing implement that disposes the optical fiber in order to form the at least one curved portion in the optical fiber, the optical fiber fixing implement comprising a material which transmits the light in the specific wavelength hand.

13. The optical observation system according to claim 1, wherein the at least one detection system includes detection systems coupled to both ends of the optical fiber, the detection systems detecting the light transmitted bidirectionally in the optical fiber.

14. An optical observation method, comprising:
inputting light, which has occurred at an uncertain position in a test region and propagated in space from an uncertain direction, from a portion other than a core at any end portion of an optical fiber, at least one curved portion of the optical fiber inputting the light propagated in the space from a clad side of the curved portion into the core inside the optical fiber, the optical fiber transmitting the light input at the at least one curved portion; and
detecting the light transmitted by the optical fiber.

15. The optical observation method according to claim 14, wherein the at least one curved portion includes curved portions, each of the curved portions being convex toward a generation source of possible light to be input.

16. The optical observation method according to claim 14, wherein the optical fiber is disposed to form a concave curved portion and convex curved portions in both sides of the concave curved portion, the convex curved portions facing different directions respectively, each of the convex curved portions serving as a sensor for inputting light.

17. The optical observation method according to claim 14, wherein a part of a clad of the optical fiber at the at least one curved portion is removed.

18. The optical observation method according to claim 14, wherein the light includes spark light, and
wherein information for determining whether a spark causing the spark light is explosive is displayed based on an intensity of a light in a specific wavelength band included in the spark light transmitted by the optical fiber.

19. The optical observation method according to claim 18, wherein a curvature of the at least one curved portion corresponds to a refractive index of the light in the specific wavelength band, the curvature being adjusted for inputting the light in the specific wavelength band.

20. The optical observation method according to claim 18, wherein the light in the specific wavelength band which transmitted a wavelength filter is input into the at least one curved portion.

* * * * *